March 17, 1959     G. F. DALES     2,878,343
THERMOSTAT
Filed Oct. 8, 1956
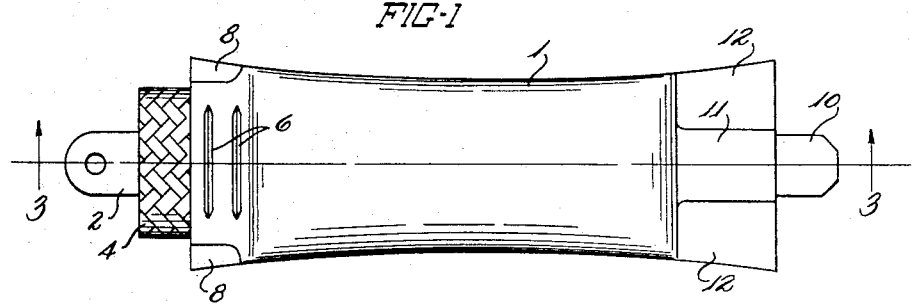
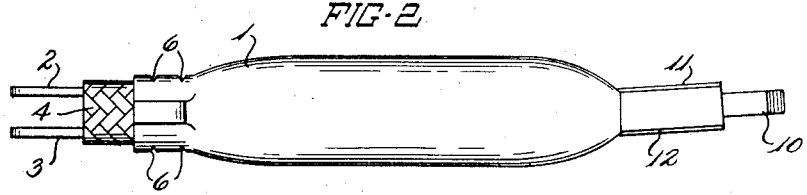
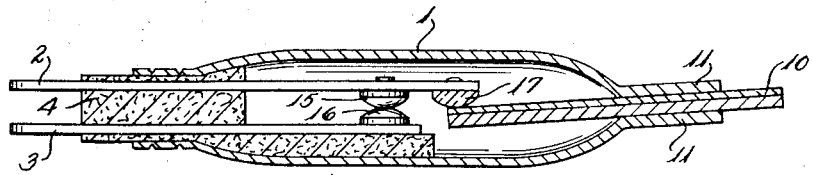
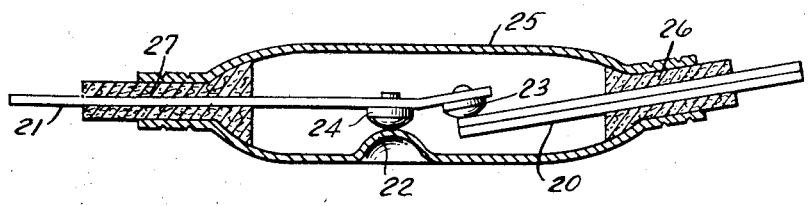
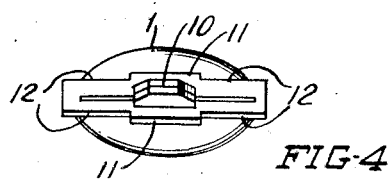
INVENTOR.
GEORGE FRANKLIN DALES
BY
ATTY-

United States Patent Office 2,878,343
Patented Mar. 17, 1959

2,878,343

THERMOSTAT

George Franklin Dales, Akron, Ohio

Application October 8, 1956, Serial No. 614,424

14 Claims. (Cl. 200—138)

This invention relates to a thermostat. Although designed more particularly as a thermostat of the midget type, it may be any size. The invention includes the thermostat and the method of calibrating it.

The housing of the thermostat is made from bendable tubing. There are two electrodes in the housing and at least one of them is held in one end of the housing. Bimetallic means is held in the other end of the housing. The two electrodes make contact within the housing and the bimetallic member is adapted to make or break this contact as its temperature changes. The thermostat is calibrated by bending the end of the tubing that holds the bimetallic member.

The tubing used in the manufacture of the housing is preferably of a heat-conducting material, such as copper or other metal. In that event, a sufficient area of the bimetallic member is kept in contact with it to maintain the two at substantially the same temperature. The housing may be of non-heat-conducting material or the bimetallic member may be thermally insulated from it and in that event the bimetallic member will extend outwardly through its end of the housing, with its outer end in heat-conducting relation with the material or the object the temperature of which is to be controlled. The tubing may be circular, oval, rectangular, etc., in cross section.

As the bimetallic member is heated and cooled, it bends and straightens out. This movement is used either to move one of the electrodes out of contact with the other electrode or to move it into contact with the other electrode. The electrode to which the bimetallic member imparts movement has sufficient elasticity to return to its original position as the bimetallic member releases its pressure upon it. If the housing is of conducting material and the bimetallic member is insulated from it, ordinarily the bimetallic member will be located on the same side of the electrode which is moved by the bimetallic member as the electrode which is not moved by the bimetallic member. To locate it on the other side will usually bring it objectionably close to the housing.

The thermostat may be used to control the operation of a heater as in a toaster or an iron, etc., or to prevent a motor from overheating, etc. Also, it may be used for controlling the operation of an air-conditioning or other refrigerating unit, etc.

Although generally both electrodes will be insulated from the housing, this is not necessary. For instance, the bimetallic member may be in electrical contact with the housing and then the electrode which is contacted by the bimetallic member need not be insulated from the housing. Alternatively, both the bimetallic member and the electrode it contacts may be insulated from the housing and the other electrode may be in conducting contact with the housing. In the latter instance, a button spun in the bottom of the housing may serve as the contact point and constitute the entire electrode.

In any of the thermostats of this invention, the inner end of the bimetallic member may move out of contact with its electrode at the end of its movement away from the electrode. However, the inner end of the bimetallic member is preferably in contact or substantially in contact with its electrode at all times, because this simplifies the calibration of the instrument. All that is required for calibration is to heat the thermostat (or the portion of the bimetallic member which extends out of the housing) to the temperature at which the thermostat is to operate, and then by bending the end of the housing which holds the bimetallic member, adjust its free end so that the electrodes are just separated at this temperature (if the bimetallic member separates the electrodes as it is heated) or are just brought into contact at this temperature (if the bimetallic member moves the electrodes into contact as it is heated).

In the preferred thermostat illustrated in the drawings, the electrodes are insulated from both the housing and the bimetallic member, the electrodes are normally in contact, and they are separated as the temperature of the bimetallic member is raised. It is designed particularly for use in circuits of low amperage, e. g., 10 to 15 amperes. As the housing carries no current, the temperature within the housing remains substantially constant, not heating more than perhaps 3 to 5 degrees.

Fiber glass insulates both electrodes from the housing and the insulation extends inwardly at the bottom of the housing so as to cover substantially half of the length of the bottom. The lower electrode rests on this and is supported by it as the upper electrode presses against it. The unsupported electrode extends farther into the housing than the supported electrode and is contacted by the bimetallic member at its inner end. Other suitable insulation may be employed.

The invention will be further explained in connection with the accompanying drawings which illustrate a preferred design of thermostat. In the drawings:

Fig. 1 is a plan view of the thermostat;

Fig. 2 is a side view of the thermostat;

Fig. 3 is a longitudinal section on the line 3—3 of Fig. 1;

Fig. 4 is a view of that end of the thermostat at which the bimetallic member is located; and Fig. 5 is a section through a modified type of thermostat.

The housing is formed of a short length of seamless metal tubing 1. It need not be more than an inch or two in length. The upper and longer electrode 2, and the lower and shorter electrode 3 are encased in fiber-glass insulation 4 and squeezed in one end of the housing. They are narrow so that there is no contact between them and the wall of the housing. In order to hold the insulation firmly in this end of the housing, the housing is preferably staked along the lines 6 at both the top and bottom thereof after the insulation has been put in place. The outside edges of this end of the housing are flattened at 8 to prevent the insulation and electrodes from shifting sidewise within the housing.

The bimetallic member 10 is squeezed in the other end of the housing by applying pressure to the surfaces 11 of the portions of the end which press against the bimetallic member, and to the surfaces 12 which do not contact the bimetallic member but are pressed together and thus prevent the bimetallic member from shifting widthwise within the housing.

The electrodes are advantageously provided with contact points 15 and 16 of silver or other suitable conducting material. The bimetallic member 10 contacts the ceramic insulating button 17 at the inner end of the upper electrode. Alternatively, this button may be fastened to the end of the bimetallic member.

The operation of the thermostat is not dependent upon the load carried by the electrodes, but is entirely dependent upon the heating and cooling of the bimetallic member which in turn heats up and cools off as the housing is heated and cooled. The two electrodes are normally in contact, the upper electrode 2 having sufficient elasticity to return to the position in which the button 15 and 16 are in contact, when not lifted by the bimetallic member. As the bimetallic member is heated, its inner end bends upwardly and lifts the upper contact button 15 out of contact with the lower contact button 16. This breaks the circuit. The electrodes 2 and 3 may be connected directly into the circuit which generates the heat, or may operate a switch which controls the flow of electricity through the heating circuit.

To calibrate the thermostat the two electrodes are placed in a circuit containing a signal, such as a light. When the two buttons 15 and 16 are in contact with one another, the light is on. The thermostat is then heated to the temperature at which it is to operate and then, by grasping the surfaces 11 by suitable means, this portion of the end of the housing is bent and the location of the inner end of the bimetallic member is altered so that the contact buttons are barely separated at this temperature. This is indicated by the signal light going out. It may be necessary to first bend the surfaces 11 in one direction and then the other. This need not change the position of the surfaces 12 with respect to the body of the housing.

Figure 5 shows a modified type of thermostat in which both the bimetallic element 20 and the electrode 21 are insulated from the housing. The other electrode 22 is a button spun in the bottom of the housing. As the bimetallic element becomes heated, its inner or free end curls upwardly and by contact with the button 23, lifts the contact button 24 of the electrode 21 out of contact with the button 22. Thus the circuit is broken. As the bimetallic element 20 cools off the electrode 21 again makes contact with the button 22 by means of the button 24. Both the bimetallic element 20 and the electrode 21 are insulated from the housing 25 by glass fiber or other suitable insulation 26, 27.

Although only the preferred design of thermostat is shown in the drawings, it will be appreciated that the modifications described herein may be made readily. Other modifications, as of details, etc., may be made without avoiding the claims which follow.

What I claim is:

1. A thermostat having a housing made of tubing, two electrodes extending through one end of the housing and held therein insulated from each other, portions of both electrodes extending into the housing and adapted to make and break contact with each other therein, and a bimetallic member passing through the other end of the housing and held therein with a portion thereof extending into the housing and adapted to move one of the electrodes by contact therewith in and out of contact with the other electrode therein as the temperature and consequently the shape of the bimetallic member changes.

2. The thermostat of claim 1 in which said portion of the bimetallic member within the electrode is positioned on the same side of the electrode it moves as said other electrode and is adapted to separate the electrodes when it bends as its temperature is raised.

3. The thermostat of claim 1 in which the housing is made of electricity-conducting metal, the bimetallic member is in contact with the housing, and said other electrode is insulated from the housing.

4. The thermostat of claim 1 in which the housing is made of electricity-conducting metal and both electrodes are insulated from the housing and the bimetallic member is in contact with the housing.

5. The thermostat of claim 1 in which the housing is made of heat-conducting material and a sufficient area of the bimetallic member is held in heat-conducting relation with the housing to quickly bring the temperature of the bimetallic member to substantially the temperature of the housing as its temperature is changed.

6. The thermostat of claim 1 in which a substantial area of the bimetallic member is exposed outside of the housing.

7. The thermostat of claim 1 in which the end of the housing in which the bimetallic member is held is squeezed directly against the bimetallic member.

8. The thermostat of claim 1 in which the end of the housing in which the bimetallic member is held is squeezed directly against the bimetallic member and the housing is staked widthwise thereof.

9. The thermostat of claim 1 in which the electrodes are above one another and the upper electrode extends farther into the housing than the lower electrode and its inner end overlies the inner end of the bimetallic member.

10. If the thermostat of claim 1 in which the housing is of metal, said other electrode is insulated from the housing, and the end of the housing which holds the bimetallic member is flattened against the bimetallic member, the flattened portion being bendable with respect to the balance of the housing whereby the location of the inner portion of the bimetallic member with respect to the electrode it is adapted to contact is adjustable for calibration of the thermostat.

11. A thermostat having a housing made of tubing, a bimetallic member held in one end of the housing and insulated therefrom, one electrode held in the other end of the housing and insulated therefrom, another electrode in the circuit with the housing, contact points on the electrodes within the housing; with a portion of the bimetallic member within the housing adapted to move a portion of the first-mentioned electrode within the housing with respect to the other electrode as the temperature of the bimetallic member is changed and thereby alter the relation of said contact points with respect to one another.

12. A thermostat formed of a housing made of bendable tubing with two electrodes therein, bimetallic means held in one end of the housing with the portion thereof within the housing adapted to contact one of the electrodes and move it with respect to the other electrode as the temperature of the bimetallic member is changed, the thermostat being calibratible by bending the end of the housing in which the bimetallic element is held.

13. A thermostat having a housing composed of metal tubing, two electrodes squeezed in one end of the tubing where they are insulated from themselves and from the tubing, said insulation extending inwardly over the bottom of the tubing for a substantial distance, one of said electrodes being positioned above the other with the lower electrode located against said insulation, the upper electrode extending farther into the tubing than said lower electrode, the ends of the electrodes normally being in contact with each other, a bimetallic member squeezed in the other end of the tubing and in heat-conducting relation therewith with its inner end under the inner end of the upper electrode and adapted to lift it out of contact with the lower electrode as it bends on heating, the end of the housing holding the bimetallic member being adapted to be bent with respect to the balance of the housing to thereby change the position of the inner end of the bimetallic member with respect to the inner end of the upper electrode, for calibration of the thermostat.

14. A thermostat formed of a housing made of bendable tubing with two electrodes therein, bimetallic means held in one end of the housing with the portion thereof within the housing adapted to contact one of the electrodes and move it with respect to the other electrode as the temperature of the bimetallic member is changed, said one electrode and the bimetallic means both being insulated from the housing and the other electrode being in electrical contact with the housing, the thermostat being calibratible by bending the end of the housing in which the bimetallic element is held.

References Cited in the file of this patent

UNITED STATES PATENTS

| | | |
|---|---|---|
| 2,574,192 | Samuel | Nov. 6, 1951 |
| 2,627,003 | Porter | Jan. 27, 1953 |
| 2,658,380 | Evans | Nov. 10, 1953 |
| 2,671,143 | Stelzer et al. | Mar. 2, 1954 |
| 2,688,246 | Holzinger et al. | Sept. 7, 1954 |
| 2,792,474 | Dales | Mar. 14, 1957 |

UNITED STATES PATENT OFFICE

CERTIFICATE OF CORRECTION

Patent No. 2,878,343                                            March 17, 1959

George Franklin Dales

It is hereby certified that error appears in the printed specification of the above numbered patent requiring correction and that the said Letters Patent should read as corrected below.

Column 3, line 6, for "button" read -- buttons --; column 4, line 19, for "If the" read -- The --.

Signed and sealed this 30th day of June 1959.

(SEAL)
Attest:

KARL H. AXLINE                                                           ROBERT C. WATSON
Attesting Officer                                                 Commissioner of Patents